United States Patent Office 3,793,373
Patented Feb. 19, 1974

3,793,373
RECOVERY OF COMPONENTS FROM THE ALKALINE WASH WATER OF OXIDATION TAILINGS
Horst Grasemann, Marl, and Hermann Rose, Essen, Germany, assignors to Chemische Werke Huels A.G., Marl, Germany
No Drawing. Filed Apr. 29, 1970, Ser. No. 33,093
Claims priority, application West Germany, Apr. 30, 1969, P 19 22 095.2
Int. Cl. C07c *29/24, 45/24*
U.S. Cl. 260—586 A                                   10 Claims

ABSTRACT OF THE DISCLOSURE

The invention relates to the recovery of unreacted and desired reaction products contained in alkaline wash water which was used to treat oxidation tailings in a process for the oxidation of aliphatic and cycloaliphatic hydrocarbons to alcohols and ketones. The alkaline wash water is cooled to a temperature below about 40° C., preferably between about 20–40° C., and the unreacted hydrocarbon, alcohols and ketones are thereby separated from the wash water and subsequently recovered therefrom.

BACKGROUND OF THE INVENTION

This invention relates to a process for the oxidation of aliphatic and cycloaliphatic hydrocarbons. More particularly, the invention relates to the recovery of valuable components produced during the process.

Oxidation processes for hydrocarbons are well known and involve the use of oxygen or oxygen-containing gases. The desired reaction products produced are usually alcohols and ketones. During the oxidation reactions, however, numerous oxidation intermediates and secondary products are also produced. For example, there can be produced the diols, one-ols, and corresponding carboxylic acids.

The reaction product mixture from the oxidation processes is usually processed to obtain the desired ketones and alcohols. Thus, when the reaction product mixture is processed to concentrate the desired alcohols and ketones, so-called oxidation tailings are obtained which contain the intermediates, secondary products, unreacted components and a certain proportion of the desired alcohols and ketones.

The oxidation tailings are washed with water rendered alkaline in order to remove the acidic compounds. The resultant wash water will also contain, in addition to the acids present as alkaline salts, proportions of the unreacted hydrocarbons and also proportions of desired alcohols and ketones. The alkaline salts of the carboxylic acids cause the other compounds contained in the wash water to be emulsified, and accordingly, these valuable components are difficult to be recovered therefrom.

In a particular process for the oxidation of hydrocarbons, the oxidation is conducted in the presence of boron compounds. The purpose is to cause the oxidation reaction to proceed preferably towards alcohol formation, by means of the protective esterification taking place during the reaction. In this process, the reaction product mixture is first washed with water to saponify the boric acid esters produced and to separate boric acid. In a subsequent step, the oxidation tailings are subjected to the alkaline wash treatment, described above.

It was found that significant amounts of unreacted hydrocarbons and desired alcohols and ketones are emulsified in the alkaline wash water from the treatment of the oxidation tailings. In general, there should be only about 3% of these components in the alkaline wash water when relating to the conversion yields of desired products. Furthermore, it was found that the ratio of the proportion of the components in the alkaline wash water was greater than that in the reaction product mixture. Thus, if the ratio of the proportion in the reaction product mixture was about 70% unreacted hydrocarbon and about 30% oxidation products, the ratio of the proportion in the alkaline wash water was about 40–50% unreacted hydrocarbon and 55–60% oxidation products.

It is not usually practical to conduct steam distillation to recover the desired components from the alkaline wash water. This is due to the fact that the steam consumption increases to a disproportionate amount because of the high vapor pressure of cyclic hydrocarbons, such as the $C_{12}$-compounds, which are of particular concern in this invention.

SUMMARY OF THE INVENTION

Accordingly, it is an object of this invention to provide a process for the recovery of desired components from the alkaline wash water of oxidation tailings produced from the oxidation of aliphatic or cycloaliphatic hydrocarbons.

Another object of this invention is to provide a process for the recovery of desired components from the alkaline wash water of oxidation tailings produced from the oxidation of cyclododecane.

Upon further study of the specification and claims, other objects and advantages of the invention will become apparent.

The objects of this invention are attained by the unexpected discovery that if the alkaline wash water, containing the desired components to be recovered in an emulsified state, is cooled to temperatures below about 40° C., preferably between about 20–40° C., the emulsion is broken and the components become separated or precipitated from the wash water. This result is surprising, since such emulsions normally are broken by heating. Accordingly, the desired components are easily separated. In addition, most of the undesired oxidation products surprisingly remain dissolved or emulsified in the alkaline wash water during the cooling step and thus, the desired unreacted hydrocarbons, ketones and alcohols are recovered.

The recovery process is applicable in oxidation processes wherein the desired components to be recovered are solid during the process condition. Hereinafter the process will be described with reference to a process involving the oxidation of cyclododecane. However, the process is also applicable to the oxidation; for example, of cycloundecane, cyclotetradecane and cyclohexadecane.

The alkaline wash water can contain about 0.3% to 3.0% by weight of oxidation products, i.e., unreacted hydrocarbons, desired reaction products, intermediate and secondary products, which is based on the percentage yield of the converted initial hydrocarbon. The wash water obtained from the washed oxidation tailings is usually at a temperature of between about 70 and 90° C. The cooling of the wash water is carried out as short as possible by conventional means such as by using a heat exchanger, wherein the cooling medium is water or air. The temperature of the wash water is reduced to below 40° C. and preferably between 20° and 40° C. as previously stated. However, it may be cooled to any temperature above the freezing point of the wash water.

Without further elaboration, it is believed that one skilled in the art can, using the preceding description, utilize the present invention to its fullest extent. The following preferred specific embodiment is therefore to be construed as merely illustrative and not limitative, of the remainder of the specification and claims in any way whatsoever.

Example

The oxidation of cyclododecane the conducted in a conventional manner known to those skilled in the art at temperatures of about 155–165° C. with oxygen-containing gases, preferably in the presence of 4–6% by weight of boric acid or ester-forming boron compounds. The conversion yield is about 25–35%.

The reaction product mixture is washed with water to saponify the boric acid esters of cyclododecanol and to remove the boric acid. The boric acid obtained in this hydrolysis step from the wash water is worked up in a conventional manner, dehydrated to m-boric acid, and recycled to the oxidation step.

The washed organic phase of the reaction product mixture is treated with a dilute aqueous sodium hydroxide solution to convert the acidic compounds into alkaline salts. The solution can have a concentration of about 0.5 to 25% by weight of sodium hydroxide and preferably 0.5 to 5% by weight. Although sodium hydroxide is preferred, it is understood that other bases such as potassium hydroxide and the like can be used. The washed oxidation reaction product containing the desired cyclododecanol and cyclododecanone is worked up by distillation in a conventional manner.

The alkaline wash water contains about 3% of oxidation products, i.e., unreacted cyclododecane, desired reaction products, intermediate and secondary products, based on the yield in converted cyclododecane, and is usually obtained at a temperature of 80° C.

According to gas-chromatography analysis, the composition of these organic products in the wash water is, for example, as follows:

40.60% of cyclododecane
2.76% of cyclododecanone
30.00% of cyclododecanol
1.09% of cyclododecanone-ol
24.45% of cyclododecanediol
1.10% of intermediate oxidation products not defined in detail The hot alkaline wash water is cooled to temperatures of below about 40° C., especially to temperatures of about 20–40° C. Cooling to below about 20° C. does not result in any increase in efficiency.

The mixture of cyclododecane, cyclododecanone, and cyclododecanol precipitate during the cooling step. The proportion of the other oxidation products remaining in the wash water is on the order of 5–6%. The precipitated products are suitably separated by filtration in a continuous manner, wherein the separation from the mother liquor is suitably conducted under reduced pressure. The use of a cellular filter plate is particularly advantageous. It is usually necessary when employing this mode of operation to acidify the mother liquor already in the vacuum chamber, since otherwise the vacuum cannot maintained, due to the foaming which occurs.

It can be seen from the following table that a greater portion of the undesired reaction products remains in the mother liquor of the alkaline washing water. In each case, the percentages were determined by gas-chromatographic analysis.

| Compounds of the mixtures | Composition of the— | |
|---|---|---|
| | Separated mixture, percent | Mixture remaining in the mother liquor, percent |
| Cyclododecane | 72.05 | 17.45 |
| Cyclododecanone | 3.25 | 2.84 |
| Cyclododecanol | 18.85 | 28.47 |
| Cyclododecanediol | 5.56 | 46.95 |
| Cyclododecanone-ol | 0.25 | 1.91 |
| Intermediate oxidation products not defined in detail | 0.04 | 5.02 |

Accordingly, of the total amount of the desired compounds contained in the wash water, more than 60% can be recovered and can be recycled into the oxidation stage.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the boron assisted oxidation of cyclododecane wherein a reaction product mixture is obtained containing boric acid esters of cyclododecanol, cyclododecanone, unreacted cyclododecane and undesired intermediate reaction products, and wherein said reaction product mixture is worked up to obtain the desired reaction products by washing said reaction mixture with water to saponify the boric acid esters of cyclododecanol and remove the boric acid, separating the aqueous phase from the organic phase and washing the organic phase with alkaline wash water to convert the acidic intermediate reaction products to salts, causing a portion of the oxidation products present in the organic phase to be emulsified in the alkaline wash water, the improvement which comprises cooling said wash water emulsion down to a temperature below about 40° C. but above the freezing point of the emulsion, thereby causing the desired cyclododecanols, cyclododecanones and unreacted cyclododecane to selectively precipitate from the emulsion and recovering said precipitate from said cooled emulsion.

2. The process of claim 1 wherein said wash water is cooled to a temperature between about 20–40° C.

3. The process of claim 1 wherein said recovery step includes filtration of the separated products from said wash water.

4. The process of claim 1 wherein the products separated from said wash water are recovered by continuous vacuum filtration by the use of a cellular filter plate, and an acid is added to the mother liquor in the vacuum chamber to prevent frothing.

5. The process of claim 1 wherein said alkaline wash water comprises sodium hydroxide.

6. A process as defined by claim 5, the concentration of the sodium hydroxide being 0.5 to 25% by weight.

7. A process as defined by claim 5, the concentration of the sodium hydroxide being 0.5 to 5% by weight.

8. A process as defined by claim 1 wherein said cooling of said wash water is conducted by passing same through a heat exchanger.

9. A process as defined by claim 1 wherein the wash water obtained from the alkaline wash step is at a temperature of about 70 to 90° C. prior to said cooling step.

10. A process as defined by claim 8 wherein the wash water obtained from the alkaline wash step is at a temperature of about 70 to 90° C. prior to said cooling step.

(References on following page)

References Cited

UNITED STATES PATENTS

| | | | |
|---|---|---|---|
| 3,546,303 | 12/1970 | Hornberger et al. | 260—586 A X |
| 2,931,834 | 4/1960 | Crouch et al. | 260—586 B |
| 3,275,692 | 9/1966 | Poehler et al. | 260—586 B |
| 3,316,302 | 4/1967 | Steeman et al. | 260—586 B |
| 3,047,629 | 7/1962 | Steeman | 260—586 B |
| 3,179,699 | 4/1965 | Waldman et al. | 260—586 B |
| 3,551,482 | 12/1970 | Gey et al. | 260—586 B |
| 3,350,465 | 10/1967 | Steeman et al. | 260—586 B |
| 3,420,897 | 1/1969 | Russell et al. | 260—586 B |

OTHER REFERENCES

Kirk-Othmer, "Encyclopedia of Chemical Technology," vol. 6, "Crysallization," pp. 497–507, 1963.

Kirk-Othmer, "Encyl. of Chem. Tech.," 2nd edition, vol. 8, pp. 151–4, 1965.

LEON ZITVER, Primary Examiner

N. MORGENSTERN, Assistant Examiner

U.S. Cl. X.R.

260—586 B, 617 H, 617 M, 666 P